United States Patent [19]

McPherson et al.

[11] 3,799,421

[45] Mar. 26, 1974

[54] BELT DRIVE FOR LINEAR PLAY ADAPTER FOR CASSETTE TAPE RECORDER

[76] Inventors: Donald F. McPherson, 98 W. Beach Dr., Hilton, N.Y. 14468; Albert F Wild, 107 Council Rock Ave., Rochester, N.Y. 14618

[22] Filed: May 23, 1973

[21] Appl. No.: 362,943

[52] U.S. Cl. .................. 226/181, 74/216.5, 226/188

[51] Int. Cl. .................. B65h 17/22

[58] Field of Search ........... 226/181, 182, 183, 170, 226/188; 74/216.5, 242.8, 219

[56] References Cited

UNITED STATES PATENTS

| | | | |
|---|---|---|---|
| 3,023,943 | 3/1962 | Schober | 226/181 |
| 3,492,442 | 1/1970 | Kaiser | 74/216.5 X |

*Primary Examiner*—Allen N. Knowles
*Assistant Examiner*—Gene A. Church
*Attorney, Agent, or Firm*—Cumpston, Shaw & Stephens

[57] ABSTRACT

An adapter for converting a cassette tape recorder to linear play has an endless belt passing between the capstan and the pinch roller of the recorder and driving a pulley within the adapter. Guide rollers guide the belt over the capstan, an idler pulley tensions the belt, and a friction roller turns coaxially with the driven pulley. The friction roller is approximately tangent to a linear drive slot, and resilient means presses a linear recording element against the friction roller for traversing the slot.

8 Claims, 2 Drawing Figures

BELT DRIVE FOR LINEAR PLAY ADAPTER FOR CASSETTE TAPE RECORDER

THE INVENTIVE IMPROVEMENT:

Adapters for converting cassette tape recorders to linear play have experienced difficulty in a linear drive device for moving a linear recording element slowly, steadily and without vibration interference. The invention involves recognition of the problems involved in linear drive adapters for cassette tape recorders and realizes a way that an adequately powerful and slip-free drive can be made steady and vibration free to advance a linear element relatively slowly through the recording slot of the adapter. The invention also aims at simplicity, economy, reliability and trouble-free operation.

SUMMARY OF THE INVENTION

The invention uses a belt drive for a linear play adapter for a cassette tape recorder having a capstan and a pinch roller. An endless belt passes over the capstan between the capstan and the pinch roller and drives a pulley. Guide rollers guide the belt over the capstan, and an idler pulley tensions the belt. A friction roller coaxial with the driven pulley turns with the driven pulley and is approximately tangent to a linear drive slot, and a linear recording element is pressed against the friction roller for traversing the slot.

DRAWINGS:

FIG. 1 is a partially cut-away plan view of a preferred embodiment of the inventive belt drive; and FIG. 2 is a partially cut-away cross sectional view of the adapter of FIG. 1 taken along the line 2—2 thereof.

DETAILED DESCRIPTION:

Figure 1:
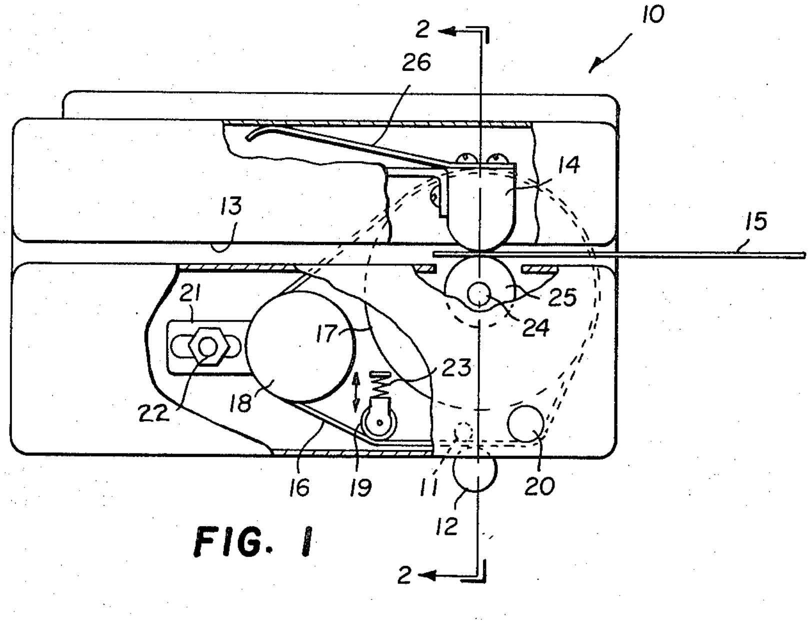
Figure 2:
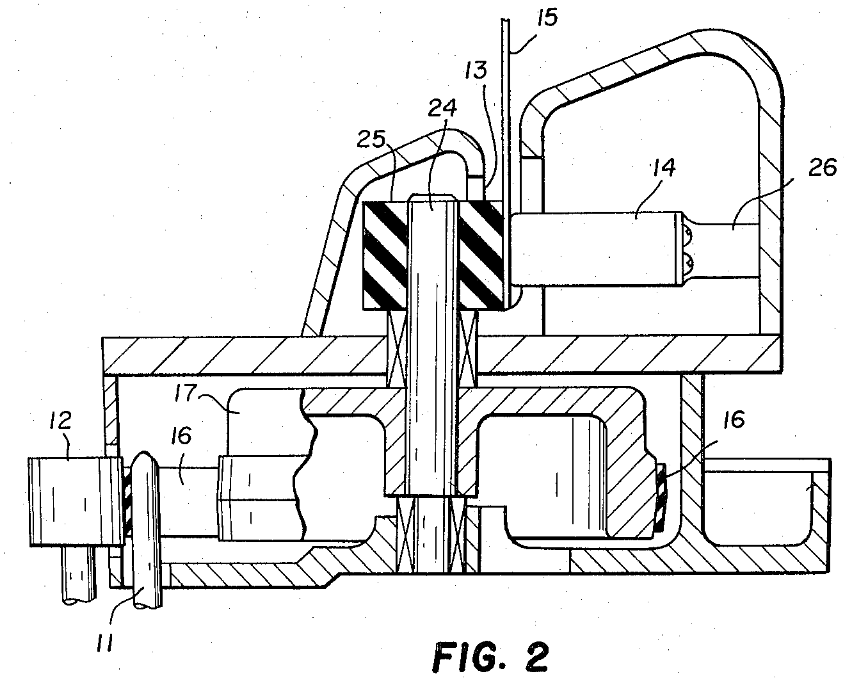

Adapter 10 is shaped to fit into the cassette slot of a host tape recorder represented in the drawings by capstan 11 and pinch roller 12. Cassette tape recorders normally have capstan 11 and pinch roller 12 movable away from and against capstan 11, and they otherwise differ in many details. Adapter 10 has a linear slot 13 traversed by a linear recording element 15 such as a flat card, photograph, etc. Card 15 has a linear magnetic strip, and magnetic head 14 extends into slot 13 to engage the magnetic strip on card 15 for recording and playing back. Card 15 moves relatively slowly through slot 13 for the longest message possible with reasonable fidelity and must advance evenly without vibration. The inventive belt drive accomplishes this as explained below.

A belt 16 passes over capstan 11 and between capstan 11 and pinch roller 12 as illustrated and is wrapped around a drive pulley 17 and an idler pulley 18. Pinch roller 12 presses belt 16 securely against capstan 11, and guide rollers 19 and 20 guide belt 16 over capstan 11 and hold belt 16 in place during removal and insertion of adapter 10 in the host recorder. Belt 16 is preferably thin and flexible for rounding the curves in its drive path, and it is preferably non-stretchable to hold its adjustment. Belt 16 can be satisfactorily formed from a strip of magnetic tape spliced into a loop of the desired size, or from plastic material such as used in making magnetic tape. Other thin and flexible materials may also be satisfactory for belt 16.

Idler roller 18 is held on an adjustable mount 21 that is set at the factory by nut 22 for properly tensioning belt 16. Belt 16 requires some freedom of motion because of slight eccentricies in pulleys and guide rollers, and spring mount 23 provides this by giving some lateral freedom to guide roller 19. Alternatively, idler roller 18 or guide roller 20 could be spring biased for the same purpose.

Pulley 17 is carried on a shaft 24 that also carries a friction roller 25 to turn with pulley 17 and extend into slot 13 to engage card 15. With pulley 17 having a diameter far larger than capstan 11, and friction roller 25 having a diameter smaller than pulley 17 but also far larger than capstan 11, friction roller 25 has a surface speed substantially slower than capstan 11 so that linear element 15 moves its magnetic track along slot 13 at a much slower pace than a magnetic tape running through the host recorder at the surface speed of capstan 11. This allows element 15 to record or play a fairly long message, especially since the inventive belt drive is relatively smooth and vibration free. A spring 26 biases magnetic head 14 against friction roller 25 to press element 15 against friction roller 25 for advancing through slot 13 as friction roller 25 rotates.

Belt 16 is wide enough to engage a substantial surface of capstan 11 and is pressed against capstan 11 by pinch roller 12 forcefully enough for a secure and nonslip engagement with capstan 11 to transmit adequate rotational torque to pulley 17 so that friction roller 25 can drive card 15 smoothly through slot 13. Belt 16 also maintains a smooth and vibration-free coupling between capstan 11 and roller 17 so that the inventive drive is steady and vibration free. Also the idler and guide rollers keep belt 16 on course so it has a long and dependable life.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the various pulleys, guides, and belts that can be arranged as suggested by the invention in a linear play adapter.

I claim:

1. A belt drive for a linear play adapter removably insertable in a cassette tape recorder having a capstan and a pinch roller, said belt drive comprising:

a an endless belt passing over said capstan between said capstan and said pinch roller;

b a pulley driven by said belt;

c guide roller means for guiding said belt over said capstan;

d idler pulley means for tensioning said belt;

e a friction roller coaxial with said driven pulley and turning with said driven pulley;

f a linear drive slot approximately tangent to said friction roller; and g means for pressing a linear recording element against said friction roller for traversing said slot.

2. The belt drive of claim 1 wherein said driven pulley and said friction roller are dimensioned so that the surface speed of said friction roller is substantially less than the surface speed of said capstan.

3. The belt drive of claim 1 wherein said guide roller means comprises a pair of guide rollers on opposite sides of said capstan.

4. The belt drive of claim 1 wherein said idler means includes a first idler roller on an adjustable mount, and a second idler roller spring-biased to tension said belt.

5. The belt drive of claim 1 wherein said means for pressing said linear element against said friction roller comprises a magnetic head spring-biased against said friction roller.

6. The belt drive of claim 5 wherein said driven pulley and said friction roller are dimensioned so that the surface speed of said friction roller is substantially less than the surface speed of said capstan.

7. The belt drive of claim 6 wherein said guide roller means comprises a pair of guide rollers on opposite sides of said capstan.

8. The belt drive of claim 7 wherein said idler roller means includes a first idler roller on an adjustable mount, and spring means for biasing one of said guide rollers to tension said belt.

* * * * *